US010428602B2

(12) United States Patent
Wern et al.

(10) Patent No.: US 10,428,602 B2
(45) Date of Patent: Oct. 1, 2019

(54) TOP DRIVE TORQUE MEASUREMENT DEVICE

(71) Applicant: Weatherford Technology Holdings, LLC, Houston, TX (US)

(72) Inventors: Frank Wern, Hannover (DE); Bjoern Thiemann, Burgwedel (DE); Aicam Zouhair, Houston, TX (US); Martin Liess, Seelze (DE); Christina Karin Hebebrand, Hannover (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 305 days.

(21) Appl. No.: 15/241,815

(22) Filed: Aug. 19, 2016

(65) Prior Publication Data

US 2017/0051568 A1    Feb. 23, 2017

Related U.S. Application Data

(60) Provisional application No. 62/207,779, filed on Aug. 20, 2015.

(51) Int. Cl.
| E21B 19/16 | (2006.01) |
| E21B 44/04 | (2006.01) |
| E21B 3/02 | (2006.01) |
| E21B 47/00 | (2012.01) |
| G01L 3/10 | (2006.01) |

(52) U.S. Cl.
CPC .............. *E21B 19/166* (2013.01); *E21B 3/02* (2013.01); *E21B 44/04* (2013.01); *E21B 47/0006* (2013.01); *G01L 3/102* (2013.01)

(58) Field of Classification Search
CPC .......... E21B 19/166; E21B 3/02; E21B 44/04; E21B 47/0006; G01L 3/102
See application file for complete search history.

(56) References Cited

U.S. PATENT DOCUMENTS

| 1,367,156 A | 2/1921 | McAlvay et al. |
| 1,610,977 A | 12/1926 | Scott |
| 1,822,444 A | 9/1931 | MacClatchie |

(Continued)

FOREIGN PATENT DOCUMENTS

| AU | 2012201644 A1 | 4/2012 |
| AU | 2013205714 A1 | 5/2013 |

(Continued)

OTHER PUBLICATIONS

Streicher Load/Torque Cell System Brochure, Streicher Group, 1 Page.

(Continued)

*Primary Examiner* — Caroline N Butcher
(74) *Attorney, Agent, or Firm* — Patterson + Sheridan, LLP

(57) ABSTRACT

A top drive system for use with a tool for handling tubulars on a drilling rig includes a motor unit; a coupling unit that transfers torque to the tool; a torque measurement device (TMD) coupled to at least one of the motor unit, the tool, or the coupling unit, wherein the TMD includes a sensing member coupled to an evaluation unit, wherein the sensing member is configured to measure a magnetostrictive effect and the evaluation unit is configured to calculate a magnitude of the torque reaction force based on the magnetostrictive effect.

19 Claims, 11 Drawing Sheets

(56) References Cited

U.S. PATENT DOCUMENTS

| | | |
|---|---|---|
| 2,370,354 A | 2/1945 | Hurst |
| 3,147,992 A | 9/1964 | Haeber et al. |
| 3,354,951 A | 11/1967 | Savage et al. |
| 3,385,370 A | 5/1968 | Knox et al. |
| 3,662,842 A | 5/1972 | Bromell |
| 3,698,426 A | 10/1972 | Litchfield et al. |
| 3,747,675 A | 7/1973 | Brown |
| 3,766,991 A | 10/1973 | Brown |
| 3,774,697 A | 11/1973 | Brown |
| 3,776,320 A | 12/1973 | Brown |
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,449,596 A | 5/1984 | Boyadjieff |
| 4,478,244 A | 10/1984 | Garrett |
| 4,497,224 A | 2/1985 | Jürgens |
| 4,593,773 A | 6/1986 | Skeie |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,053,191 A | 4/2000 | Hussey |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Rosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 | 3/2003 | Snider et al. |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B1 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Beckinghausen |
| 7,281,587 B2 | 10/2007 | Haugen |
| 7,303,022 B2 | 12/2007 | Tilton et al. |
| 7,325,610 B2 | 2/2008 | Giroux et al. |
| 7,353,880 B2 | 4/2008 | Pietras |
| 7,448,456 B2 | 11/2008 | Shahin et al. |
| 7,451,826 B2 | 11/2008 | Pietras |

(56) References Cited

U.S. PATENT DOCUMENTS

| | | |
|---|---|---|
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,591,304 B2 | 9/2009 | Juhasz et al. |
| 7,617,866 B2 | 11/2009 | Pietras |
| 7,635,026 B2 | 12/2009 | Mosing et al. |
| 7,665,515 B2 | 2/2010 | Mullins |
| 7,665,530 B2 | 2/2010 | Wells et al. |
| 7,665,531 B2 | 2/2010 | Pietras |
| 7,669,662 B2 | 3/2010 | Pietras |
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,712,523 B2 | 5/2010 | Snider et al. |
| 7,730,698 B1 | 6/2010 | Montano et al. |
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Angman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,118,106 B2 | 2/2012 | Wiens et al. |
| 8,141,642 B2 | 3/2012 | Olstad et al. |
| 8,210,268 B2 | 7/2012 | Heidecke et al. |
| 8,281,856 B2 | 10/2012 | Jahn et al. |
| 8,307,903 B2 | 11/2012 | Redlinger et al. |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,636,067 B2 | 1/2014 | Robichaux et al. |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,893,772 B2 | 11/2014 | Henderson et al. |
| 9,068,406 B2 | 6/2015 | Clasen et al. |
| 9,206,851 B2 | 12/2015 | Slaughter, Jr. et al. |
| 9,528,326 B2 | 12/2016 | Heidecke et al. |
| 9,631,438 B2 | 4/2017 | McKay |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0216924 A1 | 11/2004 | Pietras et al. |
| 2005/0000691 A1 | 1/2005 | Giroux et al. |
| 2005/0173154 A1 | 8/2005 | Lesko |
| 2005/0206163 A1 | 9/2005 | Guesnon et al. |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1* | 12/2005 | Folk ............... E21B 19/02 166/77.52 |
| 2006/0037784 A1 | 2/2006 | Walter et al. |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2007/0030167 A1 | 2/2007 | Li et al. |
| 2007/0044973 A1 | 3/2007 | Fraser et al. |
| 2007/0074588 A1* | 4/2007 | Harata ............. G01L 3/102 73/862.331 |
| 2007/0074874 A1 | 4/2007 | Richardson |
| 2007/0102992 A1 | 5/2007 | Jager |
| 2007/0131416 A1 | 6/2007 | Odell, II et al. |
| 2007/0140801 A1 | 6/2007 | Kuttel et al. |
| 2007/0144730 A1 | 6/2007 | Shahin et al. |
| 2007/0158076 A1 | 7/2007 | Hollingsworth, Jr. et al. |
| 2007/0251699 A1 | 11/2007 | Wells et al. |
| 2007/0251701 A1 | 11/2007 | Jahn et al. |
| 2007/0257811 A1 | 11/2007 | Hall et al. |
| 2008/0059073 A1 | 3/2008 | Giroux et al. |
| 2008/0093127 A1 | 4/2008 | Angman |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0151934 A1 | 6/2009 | Heidecke et al. |
| 2009/0159294 A1 | 6/2009 | Abdollahi et al. |
| 2009/0200038 A1 | 8/2009 | Swietlik et al. |
| 2009/0205820 A1 | 8/2009 | Koederitz et al. |
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 | 11/2009 | Alikin et al. |
| 2009/0274544 A1 | 11/2009 | Liess |
| 2009/0274545 A1 | 11/2009 | Liess et al. |
| 2009/0316528 A1 | 12/2009 | Ramshaw et al. |
| 2009/0321086 A1 | 12/2009 | Zimmermann |
| 2010/0032162 A1 | 2/2010 | Olstad et al. |
| 2010/0101805 A1 | 4/2010 | Angelle et al. |
| 2010/0200222 A1 | 8/2010 | Robichaux et al. |
| 2010/0206583 A1 | 8/2010 | Swietlik et al. |
| 2010/0206584 A1 | 8/2010 | Clubb et al. |
| 2010/0236777 A1 | 9/2010 | Partouche et al. |
| 2011/0036586 A1 | 2/2011 | Hart et al. |
| 2011/0039086 A1 | 2/2011 | Graham et al. |
| 2011/0088495 A1 | 4/2011 | Buck et al. |
| 2011/0214919 A1 | 9/2011 | McClung, III |
| 2011/0280104 A1 | 11/2011 | McClung, III |
| 2012/0048574 A1 | 3/2012 | Wiens et al. |
| 2012/0152530 A1 | 6/2012 | Wiedecke et al. |
| 2012/0160517 A1 | 6/2012 | Bouligny et al. |
| 2012/0212326 A1 | 8/2012 | Christiansen et al. |
| 2012/0234107 A1 | 9/2012 | Pindiprolu et al. |
| 2012/0298376 A1 | 11/2012 | Twardowski |
| 2013/0055858 A1 | 3/2013 | Richardson |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0105178 A1 | 5/2013 | Pietras |
| 2013/0207382 A1 | 8/2013 | Robichaux |
| 2013/0207388 A1 | 8/2013 | Jansson et al. |
| 2013/0233624 A1 | 9/2013 | In |
| 2013/0269926 A1 | 10/2013 | Liess et al. |
| 2013/0271576 A1 | 10/2013 | Elllis |
| 2013/0275100 A1 | 10/2013 | Ellis et al. |
| 2013/0299247 A1 | 11/2013 | Küttel et al. |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0262521 A1 | 9/2014 | Bradley et al. |
| 2014/0305662 A1 | 10/2014 | Giroux et al. |
| 2014/0326468 A1 | 11/2014 | Heidecke et al. |
| 2014/0352944 A1 | 12/2014 | Devarajan et al. |

(56) References Cited

U.S. PATENT DOCUMENTS

| | | | |
|---|---|---|---|
| 2014/0360780 A1 | 12/2014 | Moss et al. | |
| 2015/0014063 A1 | 1/2015 | Simanjuntak et al. | |
| 2015/0053424 A1 | 2/2015 | Wiens et al. | |
| 2015/0083391 A1 | 3/2015 | Bangert et al. | |
| 2015/0107385 A1 | 4/2015 | Mullins et al. | |
| 2015/0337648 A1 | 11/2015 | Zippel et al. | |
| 2016/0024862 A1 | 1/2016 | Wilson et al. | |
| 2016/0138348 A1 | 5/2016 | Kunec | |
| 2016/0145954 A1 | 5/2016 | Helms et al. | |
| 2016/0177639 A1 | 6/2016 | McIntosh et al. | |
| 2016/0215592 A1* | 7/2016 | Helms | E21B 19/16 |
| 2016/0230481 A1 | 8/2016 | Misson et al. | |
| 2017/0037683 A1 | 2/2017 | Heidecke et al. | |
| 2017/0044854 A1 | 2/2017 | Hebebrand et al. | |
| 2017/0044875 A1 | 2/2017 | Hebebrand et al. | |
| 2017/0051568 A1 | 2/2017 | Wern et al. | |
| 2017/0067303 A1 | 3/2017 | Thiemann et al. | |
| 2017/0067320 A1 | 3/2017 | Zouhair et al. | |
| 2017/0074075 A1 | 3/2017 | Liess | |
| 2017/0211327 A1 | 7/2017 | Wern et al. | |
| 2017/0211343 A1 | 7/2017 | Thiemann | |
| 2017/0284164 A1 | 10/2017 | Holmes et al. | |

FOREIGN PATENT DOCUMENTS

| | | |
|---|---|---|
| AU | 2014215938 A1 | 9/2014 |
| CA | 2 707 050 A1 | 6/2009 |
| CA | 2 841 654 A1 | 8/2015 |
| CA | 2 944 327 A1 | 10/2015 |
| DE | 102007016822 A1 | 10/2008 |
| EP | 0 250 072 A2 | 12/1987 |
| EP | 1 619 349 A2 | 1/2006 |
| EP | 1772715 A2 | 4/2007 |
| EP | 1 961 912 A1 | 8/2008 |
| EP | 1 961 913 A1 | 8/2008 |
| EP | 2085566 A2 | 8/2009 |
| EP | 2 322 357 A1 | 5/2011 |
| EP | 3032025 A1 | 6/2016 |
| GB | 1487948 A | 10/1977 |
| GB | 2 077 812 A | 12/1981 |
| GB | 2 180 027 A | 3/1987 |
| GB | 2 228 025 A | 8/1990 |
| GB | 2 314 391 A | 12/1997 |
| WO | 2004/079153 A2 | 9/2004 |
| WO | 2004/101417 A2 | 11/2004 |
| WO | 2007/001887 A2 | 1/2007 |
| WO | 2007/070805 A2 | 6/2007 |
| WO | 2007127737 A2 | 11/2007 |
| WO | 2008005767 A1 | 1/2008 |
| WO | 2009/076648 A2 | 6/2009 |
| WO | 2012100019 A1 | 7/2012 |
| WO | 2012/115717 A2 | 8/2012 |
| WO | 2014056092 A1 | 4/2014 |
| WO | 2015/000023 A1 | 1/2015 |
| WO | 2015/119509 A1 | 8/2015 |
| WO | 2015/127433 A1 | 8/2015 |
| WO | 2015176121 A1 | 11/2015 |
| WO | 2016197255 A1 | 12/2016 |
| WO | 2017/044384 A1 | 3/2017 |

OTHER PUBLICATIONS

Enhanced Torque & Tension Sub With Integrated Turns Brochure, 3PS, Inc.,, 2 Pages.

PCT International Search Report and Written Opinion dated Jan. 12, 2017, for International Patent Application No. PCT/US2016/047813.

EPO Partial European Search Report dated Jul. 31, 2018, for European Application No. 18159597.6.

European Patent Office; Extended Search Report for Application No. 18160808.4; dated Sep. 20, 2018; 8 total pages.

EPO Partial European Search Report dated Oct. 4, 2018, for European Patent Application No. 18159598.4.

EPO Extended European Search Report dated Oct. 5, 2018, for European Patent Application No. 18173275.1.

EPO Extended European Search Report dated Nov. 6, 2018, for European Application No. 18159597.6.

International Search Report and Written Opinion in PCT/US2018/042812 dated Oct. 17, 2018.

Extended Search Report in application EP18177312.8 dated Nov. 6, 2018.

A123 System; 14Ah Prismatic Pouch Cell; Nanophosphate® Lithium-Ion; www.a123systems.com; date unknown; 1 page.

Lefevre, et al.; Drilling Technology; Deeper, more deviated wells push development of smart drill stem rotary shouldered connections; dated 2008; 2 total pages.

PCT Invitaiton to Pay Additional Fees for International Application No. PCT/US2008/086699; dated Sep. 9, 2009; 7 total pages.

PCT Notification of Transmittal of the International Search Report and the Written Opinion of the International Searching Authority for International Application No. PCT/US2008/086699; dated Sep. 11, 2009; 19 total pages.

National Oilwell Varco; Rotary Shoulder Handbook; dated 2010; 116 total pages.

Weatherford; TorkSub™ Stand-Alone Torque Measuring System; dated 2011-2014; 4 total pages.

Australian Examination Report for Application No. 2008334992; dated Apr. 5, 2011; 2 total pages.

European Search Report for Application No. 08 860 261.0-2315; dated Apr. 12, 2011; 4 total pages.

Eaton; Spool Valve Hydraulic Motors; dated Sep. 2011; 16 total pages.

European Extended Search Report for Application No. 12153779.9-2315; dated Apr. 5, 2012; 4 total pages.

Australian Examination Report for Application No. 2012201644; dated May 15, 2013; 3 total pages.

Warrior; 250E Electric Top Drive (250-TON); 250H Hydraulic Top Drive (250-TON); dated Apr. 2014; 4 total pages.

Hydraulic Pumps & Motors; Fundamentals of Hydraulic Motors; dated Jun. 26, 2014; 6 total pages.

Warrior; Move Pipe Better; 500E Electric Top Drive (500 ton-1000 hp); dated May 2015; 4 total pages.

Canadian Office Action for Application No. 2,837,581; dated Aug. 24, 2015; 3 total pages.

European Extended Search Report for Application No. 15166062.8-1610; dated Nov. 23, 2015; 6 total pages.

Australian Examination Report for Application No. 2014215938; dated Feb. 4, 2016; 3 total pages.

Rexroth; Bosch Group; Motors and Gearboxes; Asynchronous high-speed motors 1 MB for high speeds; dated Apr. 13, 2016; 6 total pages.

Canadian Office Action for Application No. 2,837,581; dated Apr. 25, 2016; 3 total pages.

PCT Notification of Transmittal of the International Search Report and the Written Opinion of the International Searching Authority for International Application No. PCT/US2015/061960; dated Jul. 25, 2016; 16 total pages.

PCT Notification of Transmittal of the International Search Report and the Written Opinion of the International Searching Authority for International Application No. PCT/US2016/049462; dated Nov. 22, 2016; 14 total pages.

PCT Notification of Transmittal of the International Search Report and the Written Opinion of the International Searching Authority for International Application No. PCT/US2016/050542; dated Nov. 25, 2016; 13 total pages.

PCT Notification of Transmittal of the International Search Report and the Written Opinion of the International Searching Authority for International Application No. PCT/US2016/046458; dated Dec. 14, 2016; 16 total pages.

PCT Notification of Transmittal of the International Search Report and the Written Opinion of the International Searching Authority for International Application No. PCT/US2016/050139; dated Feb. 20, 2017; 20 total pages.

(56) References Cited

OTHER PUBLICATIONS

PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.
EPO Extended European Search Report dated Jul. 19, 2018, for European Application No. 18159595.0.
EPO Extended European Search Report dated Jul. 17, 2018, for European Application No. 18158050.7.
Cookson, Colter, "Inventions Speed Drilling, Cut Costs," The American Oil & Gas Reporter, Sep. 2015, 2 pages.
Ennaifer, Amine et al., "Step Change in Well Testing Operations," Oilfield Review, Autumn 2014: 26, No. 3, pp. 32-41.
Balltec Lifting Solutions, LiftLOK™ Brochure, "Highest integrity lifting tools for the harshest environments," 2 pages.
Balltec Lifting Solutions, CoilLOK™ Brochure, "Highest integrity hand-held coiled tubing handling tools," 2 pages.
Peters; Tool Coupler for Use With a Top Drive; U.S. Appl. No. 15/656,508, filed Jul. 21, 2017. (Application not attached to IDS.).
Fuehring et al.; Tool Coupler With Rotating Coupling Method for Top Drive; U.S. Appl. No. 15/445,758, filed Feb. 28, 2017. (Application not attached to IDS.).
Bell; Interchangeable Swivel Combined Multicoupler; U.S. Appl. No. 15/607,159, filed May 26, 2017 (Application not attached to IDS.).
Amezaga; Dual Torque Transfer for Top Drive System; U.S. Appl. No. 15/447,881, filed Mar. 2, 2017. (Application not attached to IDS.).
Zouhair; Coupler With Threaded Connection for Pipe Handler; U.S. Appl. No. 15/444,016, filed Feb. 27, 2017. (Application not attached to IDS.).
Liess; Downhole Tool Coupling System; U.S. Appl. No. 15/670,897, filed Aug. 7, 2017. (Application not attached to IDS.).
Muller et al; Combined Multi-Coupler With Rotating Locking Method for Top Drive; U.S. Appl. No. 15/721,216, filed Sep. 29, 2017. (Application not attached to IDS.).
Amezaga et al; Tool Coupler With Threaded Connection for Top Drive; U.S. Appl. No. 15/457,572, filed Mar. 13, 2017. (Application not attached to IDS.).
Wiens; Combined Multi-Coupler With Locking Clamp Connection for Top Drive; U.S. Appl. No. 15/627,428, filed Jun. 19, 2017. (Application not attached to IDS.).
Henke et al.; Tool Coupler With Sliding Coupling Members for Top Drive; U.S. Appl. No. 15/448,297, filed Mar. 2, 2017. (Application not attached to IDS.).
Schoknecht et al.; Combined Multi-Coupler With Rotating Fixations for Top Drive; U.S. Appl. No. 15/447,926, filed Mar. 2, 2017. (Application not attached to IDS.).
Metzlaff et al.; Combined Multi-Coupler for Top Drive; U.S. Appl. No. 15/627,237, filed Jun. 19, 2017. (Application not attached to IDS.).
Liess; Combined Multi-Coupler for Top Drive; U.S. Appl. No. 15/656,914, filed Jul. 21, 2017. (Application not attached to IDS.).
Liess et al.; Combined Multi-Coupler; U.S. Appl. No. 15/656,684, filed Jul. 21, 2017. (Application not attached to IDS).
Amezaga et al.; Tool Coupler With Data and Signal Transfer Methods for Top Drive; U.S. Appl. No. 15/730,305, filed Oct. 11, 2017. (Application not attached to IDS).
Liess; Tool Coupler With Threaded Connection for Top Drive; U.S. Appl. No. 15/806,560, filed Nov. 8, 2017. (Application not attached to IDS).
Peters; Tool Coupler for Use With a Top Drive; U.S. Appl. No. 15/656,508, filed Jul. 21, 2017. (Application not attached to IDS.), U.S. 2019/0027860, published Jan. 27, 2019.
Fuehring et al.; Tool Coupler with Rotating Coupling Method for Top Drive; U.S. Appl. No. 15/445,758, filed Feb. 28, 2017. (Application not attached to IDS.), U.S. 2018/0245433, published Aug. 30, 2018.
Bell; Interchangeable Swivel Combined Multicoupler; U.S. Appl. No. 15/607,159, filed May 26, 2017 (Application not attached to IDS.), U.S. 2018/0340398, published Nov. 29, 2018.
Amezaga; Dual Torque Transfer For Top Drive System; U.S. Appl. No. 15/447,881, filed Mar. 2, 2017. (Application not attached to IDS.), U.S. 2018/0252041, published Sep. 6, 2018.
Zouhair; Coupler with Threaded Connection for Pipe Handler; U.S. Appl. No. 15/444,016, filed Feb. 27, 2017. (Application not attached to IDS.), U.S. 2018/0245432, published Aug. 30, 2018.
Liess; Downhole Tool Coupling System; U.S. Appl. No. 15/670,897, filed Aug. 7, 2017. (Application not attached to IDS.), U.S. 2019/0040914, publiished Feb. 7, 2019.
Muller et al; Combined Multi-Coupler With Rotating Locking Method for Top Drive; U.S. Appl. No. 15/721,216, filed Sep. 29, 2017. (Application not attached to IDS.), U.S. 2019/010970, published Apr. 4, 2019.
Amezaga et al; Tool Coupler With Threaded Connection for Top Drive; U.S. Appl. No. 15/457,572, filed Mar. 13, 2017. (Application not attached to IDS.), U.S. 2018/0258998, published Sep. 13, 2018.
Wiens; Combined Multi-Coupler with Locking Clamp Connection for Top Drive; U.S. Appl. No. 15/627,428, filed Jun. 19, 2017. (Application not attached to IDS), U.S. 2018/0363388, published Dec. 20, 2018.
Henke et al.; Tool Coupler With Sliding Coupling Members for Top Drive; U.S. Appl. No. 15/448,297, filed Mar. 2, 2017. (Application not attached to IDS), U.S. 2018/0363388, published Sep. 6, 2018.
Schoknecht et al.; Combined Multi-Coupler Multi-Rotating Fixations for Top Drive; U.S. Appl. No. 15/447,926, filed Mar. 2, 2017. (Application not attached to IDS), U.S. 2018/0252269, published Sep. 6, 2018.
Metzlaff et al; Combined Multi-Coupler for Top Drive; U.S. Appl. No. 15/627,237; filed Jun. 19, 2017. (Application not attached to IDS.), U.S. 2018/0363386, published Dec. 20, 2018.
Liess; Combined Multi-Coupler for Top Drive; U.S. Appl. No. 15/656,914, filed Jul. 21, 2017. (Application not attached to IDS.), U.S. 2019/0024721, published Jan. 24, 2019.
Liess et al.; Combined Multi-Coupler; U.S. Appl. No. 15/656,684, filed Jul. 21, 2017. (Application not attached to IDS), U.S. 2018/0258717, published Sep. 13, 2018.
Amezaga et al.; Tool Coupler With Data and Signal Transfer Methods for Top Drive; U.S. Appl. No. 15/730,305, filed Oct. 11, 2017. (Application not attached to IDS), U.S. 2019/0106977, published Apr. 11, 2019.
Liess; Tool Coupler with Threaded Connection for Top Drive; U.S. Appl. No. 15/806,560, filed Nov. 8, 2017. (Application not attached to IDS), U.S. 2018/0258999, published Sep. 13, 2018.

* cited by examiner

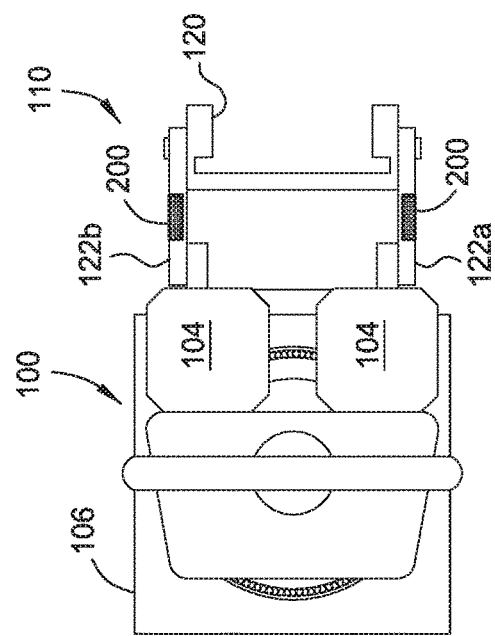
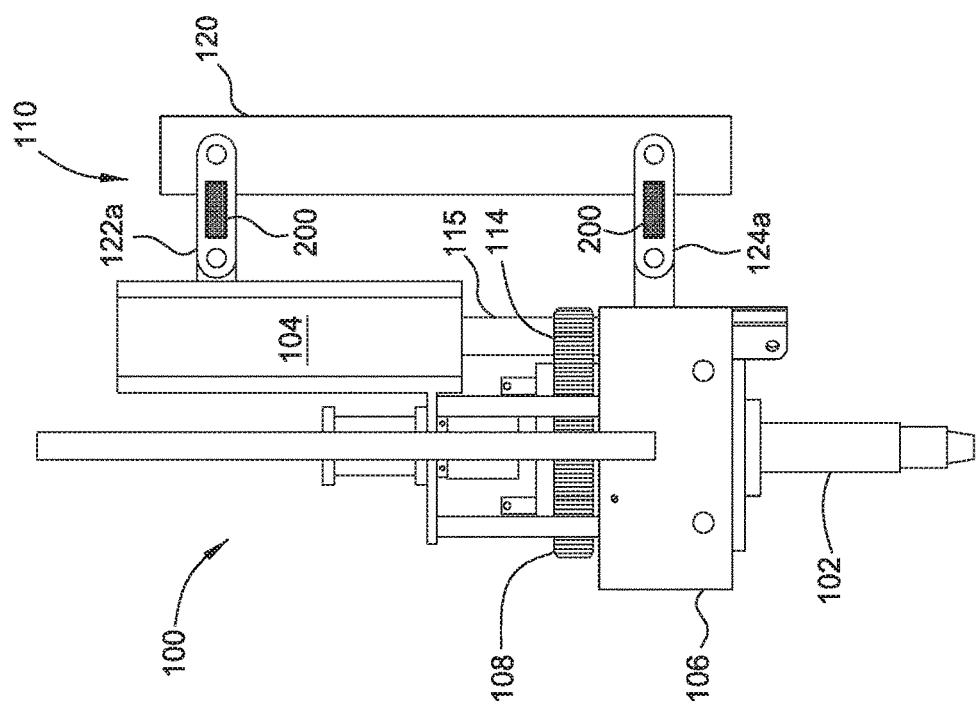
FIG. 2B
FIG. 2A

US 10,428,602 B2

TOP DRIVE TORQUE MEASUREMENT DEVICE

BACKGROUND OF THE INVENTION

Field of the Invention

Embodiments of the present invention generally relate to a method and apparatus for measuring torque in a top drive system.

Description of the Related Art

A wellbore is formed to access hydrocarbon-bearing formations (e.g., crude oil and/or natural gas) or for geothermal power generation by the use of drilling. Drilling is accomplished by utilizing a drill bit that is mounted on the end of a drill string. To drill within the wellbore to a predetermined depth, the drill string is often rotated by a top drive on a surface rig. After drilling to a predetermined depth, the drill string and drill bit are removed and a section of casing is lowered into the wellbore. An annulus is thus formed between the string of casing and the formation. The casing string is hung from the wellhead. A cementing operation is then conducted in order to fill the annulus with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

Top drives are equipped with a motor for rotating the drill string. The quill of the top drive is typically threaded for connection to an upper end of the drill pipe in order to transmit torque to the drill string. It is important to accurately measure the torque transmitted by the top drive to ensure proper engagement between the quill of the top drive and the drill string. Furthermore, the torque must be accurately measured to prevent overloading the drill string, drill head, and/or drill bit.

Therefore, there is a need for an apparatus and method for accurately measuring the torque provided by the top drive system.

SUMMARY OF THE INVENTION

In one embodiment, a top drive system for use with a tool for handling tubulars on a drilling rig includes a motor unit; a coupling unit that transfers torque to the tool; a torque measurement device (TMD) coupled to at least one of the motor unit, the tool, or the coupling unit, wherein the TMD includes a sensing member coupled to an evaluation unit, wherein the sensing member is configured to measure a magnetostrictive effect and the evaluation unit is configured to calculate a magnitude of the torque reaction force based on the magnetostrictive effect.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A is a side-view of the motor unit coupled to a rail bracket.

FIG. 2B is a top-view of the motor unit coupled to the rail bracket.

DETAILED DESCRIPTION

While the foregoing is directed to embodiments of the present invention, other and further embodiments of the invention may be devised without departing from the basic scope thereof, and the scope thereof is determined by the claims that follow.

Figure 1:
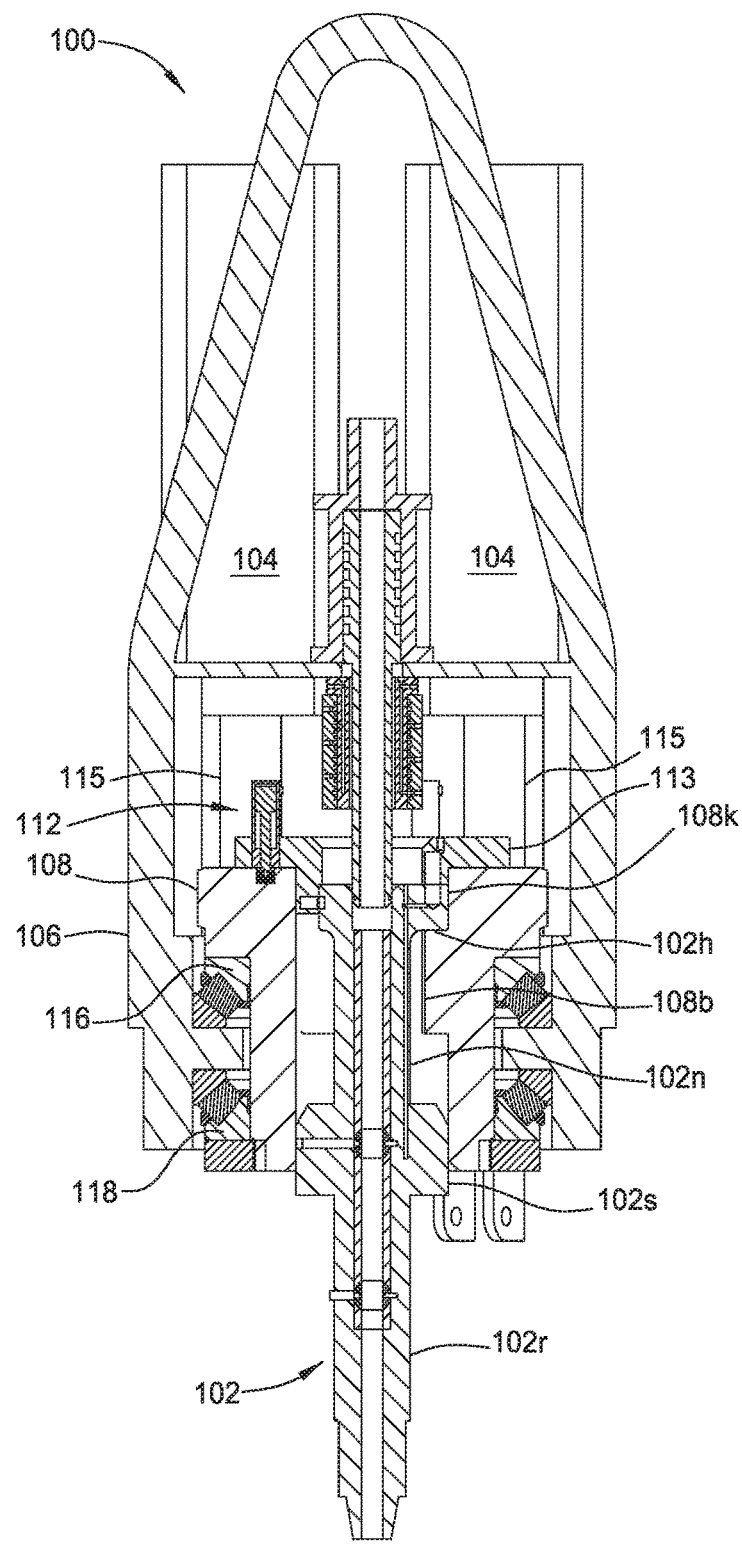
FIG. 1 illustrates a motor unit of a top drive system, according to one embodiment of the present disclosure.

FIG. 1 illustrates a motor unit 100 of a top drive system. An exemplary top drive system is disclosed in U.S. Patent Application No. 62/107,599, which is hereby fully incorporated by reference, in particular, paragraphs [0045]-[0058], [0063], [0086]-[0091], [0094]-[0096], and [0139]-[0142] and FIGS. 2A, 3, 4F-4K, 9A, and 9B.

The motor unit 100 is connected to a tool 102, as shown in FIGS. 1-5. The tool 102 is configured for attachment to a casing, drilling, and/or cementing string. The motor unit 100 includes drive motors 104, a drive body 106, a swivel, a rail bracket 110 (FIGS. 2A and 2B), and motor gears 114 (FIG. 2A).

In one embodiment, the motor unit 100 is attached to a coupling unit. The coupling unit transfers torque and load from the motor unit 100 to the tool 102. The coupling unit may include a drive gear 108 and a thread compensator 112. The drive gear 108 includes a bore therethrough and comprises an inner coupling mechanism that can connect one of several tools 102, such as a drilling tool exemplarily shown in FIG. 1. The compensator 112 is configured to remove strain on threads during make-up and break out of connections. The drive gear 108 is rotatable relative to the drive body 106. For example, an up-thrust bearing 116 and a down-thrust bearing 118 allow the drive gear 108 to rotate relative to the drive body 106. The drive motors 104 are operable to torsionally drive respective motor gears 114 via a shaft 115. The motor gears 114 are meshed with the drive gear 108 for torsional driving thereof.

The rail bracket 110 includes upper bridges 122a and 122b, lower bridges 124a and 124b, and a trolley 120 configured to counteract torque applied to the tool 102. The drive body 106 is coupled to the rail bracket 110, as shown in FIGS. 2A and 2B. In one embodiment, an upper end of the drive body 106 is fastened to the trolley 120 via the upper bridges 122a and 122b. The trolley 120 and the upper bridges 122a,b thereby torsionally restrain the upper end of the drive body 106 while allowing vertical movement of the motor unit 100. In one embodiment, a lower end of the drive body 106 is also coupled to the rail bracket 110, such as by fastening the drive body 106 to the trolley 120 via the lower bridges 124a and 124b. The trolley 120 and the lower bridges 124a,b thereby torsionally restrain the lower end of the drive body 106 while allowing vertical movement of the motor unit 100. The trolley 120 is movable vertically along a rail to raise and lower the casing, drilling, and/or cementing strings attached to the tool 102.

Referring again to FIG. 1, the tool 102 may include a head 102h, a neck 102n, a lifting shoulder 102s, and a torso 102r. In one embodiment, the compensator 112 includes a lock ring 113 having retractable lock pins, which when extended, are configured to engage respective slots formed in the head 102h of the tool 102, thereby connecting the lock ring 113 to the tool 102 and allowing a lift up via the compensator 112. Alternatively, a rotating latch ring may connect the lock ring 113 to the tool 102. The tool 102 is further secured relative to the drive body 106 by engagement with a bayonet profile 108b and a locking profile 108k on the drive gear 108 with respective profiles on the tool 102. As a result, the tool 102 is longitudinally and torsionally connected to the drive gear 108, thereby forming a top drive.

The motor unit 100 includes at least one torque measurement device for measuring a torque exerted on the motor unit 100. The torque measurement device may be disposed at any appropriate location on the motor unit 100 to increase accuracy and response time and decrease the influence of a weight load on the tool 102.

In one embodiment, the motor unit 100 includes a torque measurement device (TMD) 200 on the rail bracket 110, as shown in FIGS. 2A and 2B. For example, a respective TMD 200 is disposed on at least one of the bridges 122a,b and 124a,b. In one embodiment, two TMDs 200 are used on lower respective bridges 124a,b. In another embodiment, four TMDs 200 are disposed on respective upper and lower bridges 122a,b and 124a,b. In this embodiment, the TMDs are mounted on the upper and lower bridges to enhance measurement accuracy and compensation. Each TMD 200 may be disposed on an outer-facing surface (as shown in FIGS. 2A and 2B) or an inner-facing surface of each respective bridge. The TMD 200 includes any appropriate sensor for measuring torque. For example, the TMD 200 includes sensing members, such as any appropriate load cell for measuring strain and compression. The load cells may be appropriately positioned on the bridges 122a,b and 124a,b to measure the torque exerted on the motor unit 100. The TMD 200 may be connected to an evaluation unit, such as a processor, for interpreting torque measurements. For example, when torque is exerted on the motor unit 100, the torque changes an electrical resistance of the load cells in proportion to the torque. The change in electrical resistance of the load cell is transmitted to the evaluation unit, where the change is calibrated to correspond to a torque exerted on the tool 102. The upper and lower bridges 122a,b and 124a,b may tilt due to vertical or horizontal movement of the motor unit 100 relative to the bracket 110. The tilting of the bridges 122a,b and 124a,b changes the electrical resistance of the load cells in proportion to a tilting angle of the bridges 122a,b and 124a,b causing an incorrect torque measurement by the evaluation unit. The tilting angle of the bridges 122a,b, and 124a,b may be measured relative to the motor unit 100 and/or the bracket 110. The measured tilting angle and change in electrical resistance of the load cell is transmitted to the evaluation unit, where the change in electrical resistance and measured tilting angle are calibrated to correspond to a torque exerted on the tool 102. Alternatively, load measuring bolts may be used to connect the bridges 122a,b and 124a,b to the bracket 110 and motor unit 100. The load measuring bolts may measure the load exerted on the bridges 122a,b, and 124a,b due to vertical or horizontal movement of the motor unit 100 relative to the bracket 110. The measured load is transmitted to the evaluation unit with the change in electrical resistance of the load cell, where the change in electrical resistance and measured load are calibrated to correspond to a torque exerted on the tool 102.

Figure 3A:
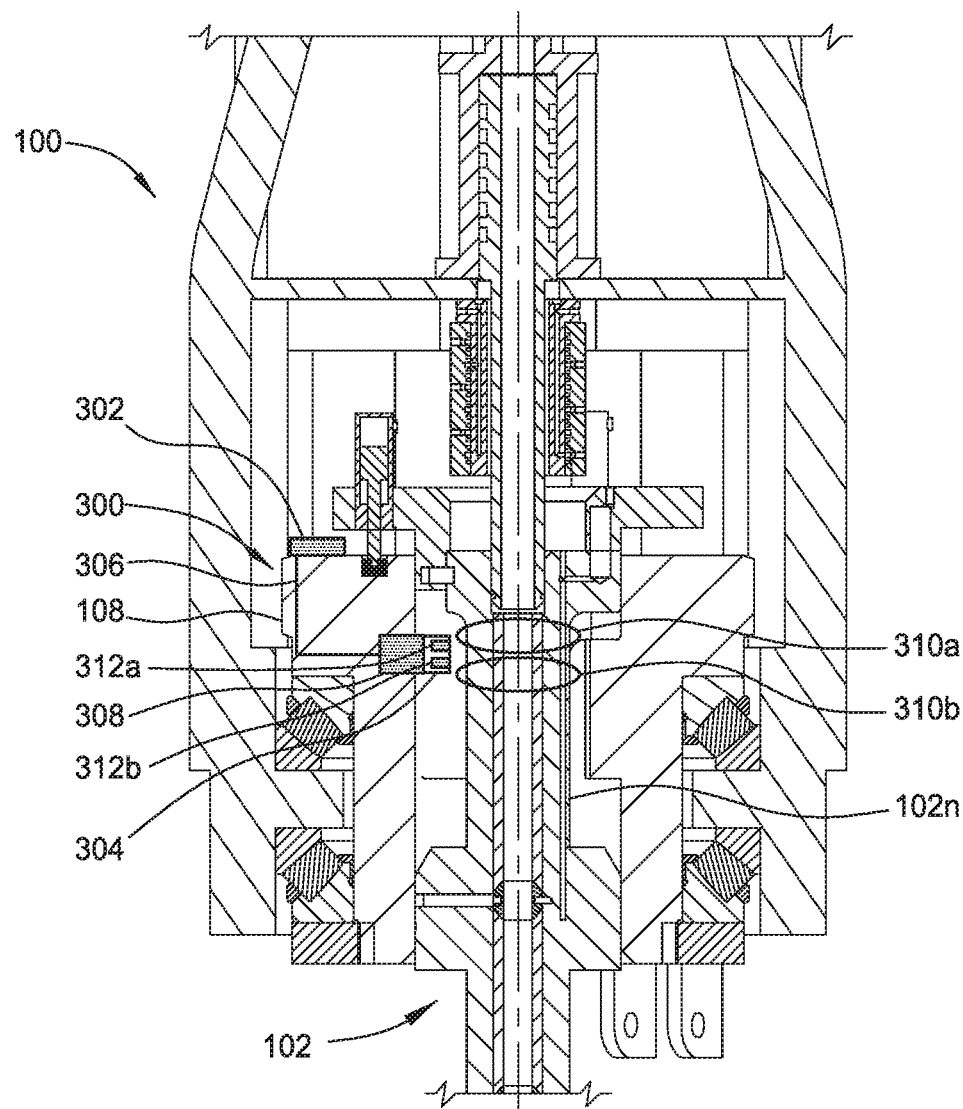
FIG. 3A is an enlarged view of the motor unit having a torque measuring device according to one embodiment of the present disclosure in a first position.
Figure 3B:
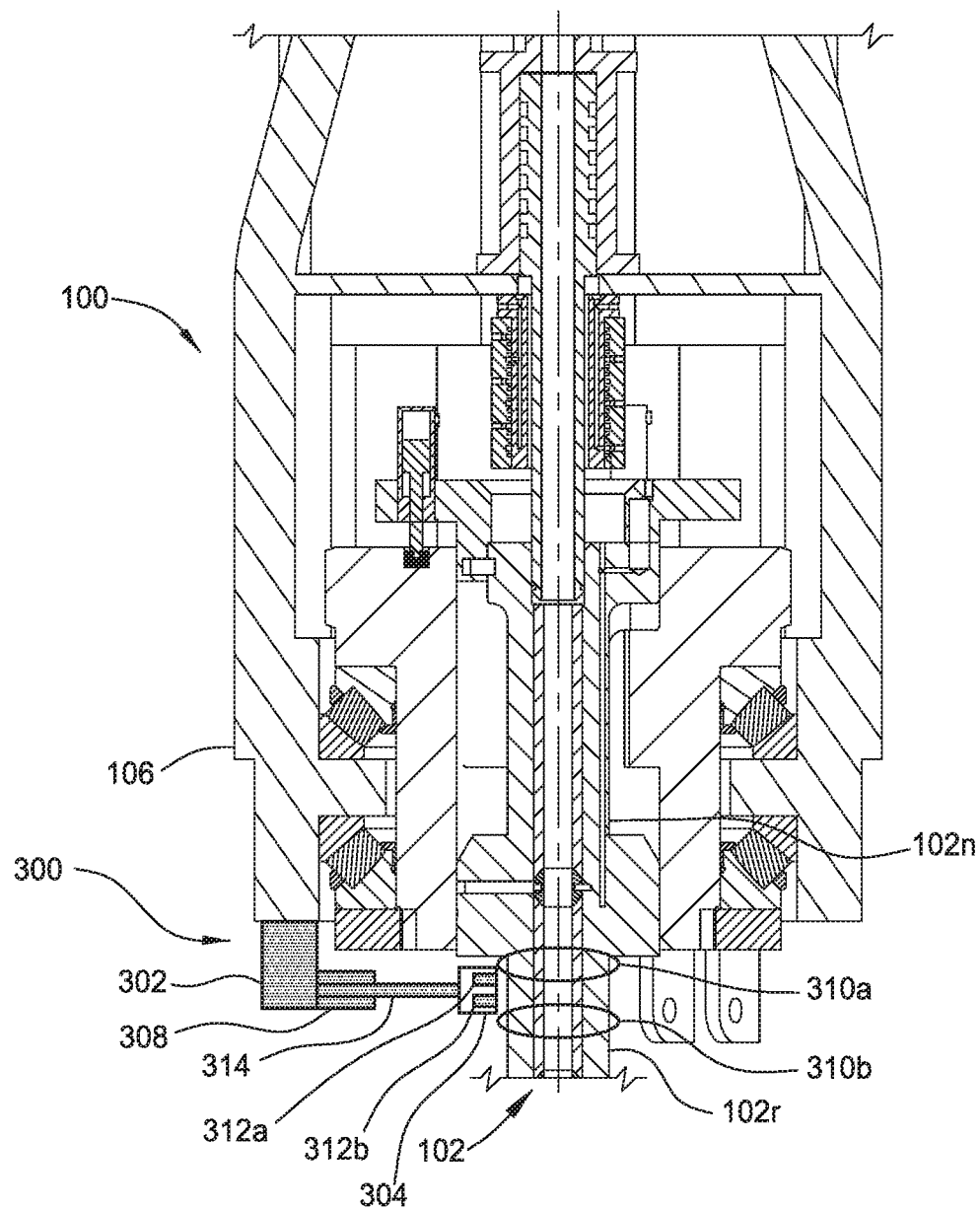
FIG. 3B is an enlarged view of the motor unit having the torque measuring device of FIG. 3A in a second position.

FIGS. 3A and 3B show an enlarged view of the motor unit 100 having a torque measurement device (TMD) 300, according to another embodiment of the disclosure. As shown in FIG. 3A, the TMD 300 is disposed on the drive gear 108. The TMD 300 includes an evaluation unit 302, such as a processor, connected to a sensing member 304 via cable 306. Alternatively, the evaluation unit 302 may communicate with the sensing member 304 wirelessly. The TMD 300 may also include a positioning device 308 having a positioning shaft 314 (FIG. 3B) configured to move the sensing member 304 between a retracted position and an extended position. For example, the sensing member 304 is in the retracted position during the installation of the tool 102. After connecting the tool 102 to the motor unit 100, the positioning shaft 314 moves the sensing member 304 towards the extended position. The TMD 300 includes any appropriate sensing member 304 for high precision, contactless torque measurements. For example, the sensing member 304 is configured to measure a magnetostrictive effect on the tool 102.

In one embodiment, the sensing member 304 includes at least one inverse magnetostrictive sensor. At least a portion of the tool 102 includes ferromagnetic material. For example, the tool includes magnetized areas 310a and 310b. As shown, the magnetized areas 310a,b are disposed on the neck 102n of the tool 102. The magnetized areas 310a,b are axially aligned with a corresponding number of sensors in the sensing member 304, such as inverse magnetostrictive sensors 312a and 312b. As shown, the magnetized areas 310a,b and the sensors 312a,b are laterally spaced apart. When the tool 102 is subject to torque, a strain on an outer surface of the tool 102 changes the dimensions of the magnetized areas 310a,b, thereby changing a magnetic field between the magnetized areas 310a,b and the sensors 312a,b. The inverse magnetostrictive sensors 312a,b are configured to measure the magnetic field changes in real time. Thereafter, the sensing member 304 transmits the magnetic field measurements to the evaluation unit 302 via the cable 306. The evaluation unit 302 calculates the magnitude of torque exerted on the magnetized areas 310a,b of the tool 102 based on the change in the magnetic field measured by the sensors 312a,b.

In another embodiment, the sensing member 304 includes an anisotropic magnetostrictive sensor. In this embodiment, the sensing member 304 is axially aligned with a magnetized area, such as area 310a or 310b. In operation, torque exerted on the tool 102 may cause a compressive stress and/or tensile stress on the magnetized area. The permeability for magnetization in a direction of compressive stress is different in comparison to magnetization in a direction of tensile stress. The anisotropic magnetostrictive sensor in the sensing member 304 is configured to measure the difference in permeability and transmit the measurements to the evaluation unit 302 via the cable 306. Thereafter, the evaluation unit 302 calculates the magnitude of torque exerted on the magnetized area of the tool 102 based on the difference in permeability.

As shown in FIG. 3B, the TMD 300 may be disposed on the drive body 106. For example, the TMD 300 is attached to a lower end of the drive body 106. As shown, the magnetized areas 310a,b are disposed on the torso 102r of the tool 102. In one embodiment, the sensing member 304 having the inverse magnetostrictive sensors 312a,b is axially aligned with corresponding magnetized areas 310a,b for measuring the change in magnetic field therebetween. In another embodiment, the sensing member 304 having the anisotropic magnetostrictive sensor is axially aligned with a corresponding magnetized area 310a or 310b for measuring permeability in compression and tension.

Figure 4:
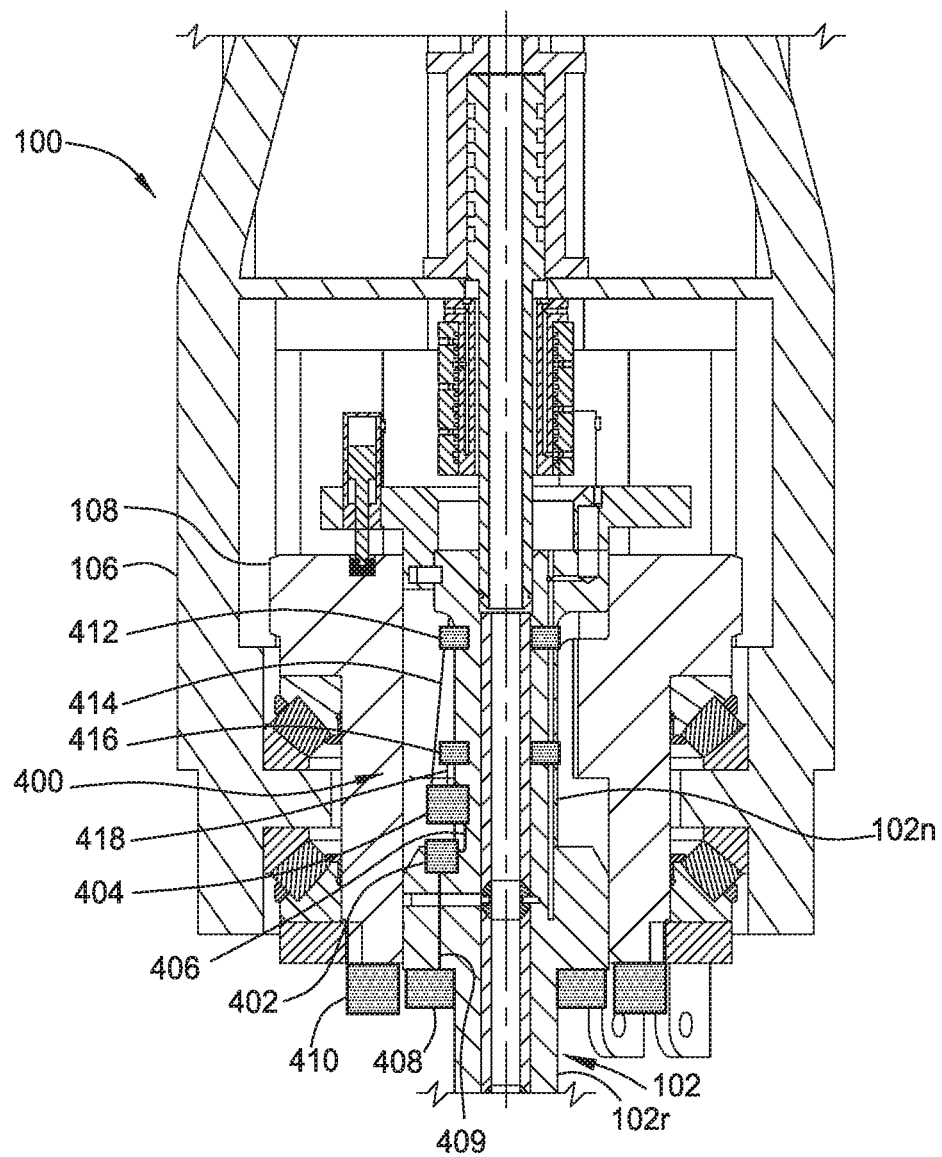
FIG. 4 is an enlarged view of the motor unit having a torque measuring device according to another embodiment of the present disclosure.

FIG. 4 shows an enlarged view of the motor unit 100 having a torque measurement device (TMD) 400, according to another embodiment of the disclosure. As shown, the TMD 400 is disposed on the neck 102n of the tool 102. The TMD 400 may also, or alternatively, be disposed on the torso 102r of the tool 102. The TMD 400 includes any appropriate sensor for high precision, contactless torque measurements, such as an optical sensor. The TMD 400 includes an evaluation unit 402, such as a processor, connected to a coupling member 408 via a cable 409. Alternatively, the evaluation unit 402 may communicate with the coupling member 408 wirelessly. The drive gear 108 includes a device 410 for transmitting energy and data with the coupling member 408. The coupling member 408 is configured to wirelessly and continuously transfer measurements processed by the evaluation unit 402 to the device 410. Power transmission from the device 410 to the coupling member 408 is performed by using induction. Alternatively, power and data transmission between the device 410 and the coupling member 408 is performed via cables through the swivel. Alternatively, power may be generated directly at the tool 102 or stored for use in a battery or an electrical accumulator.

The evaluation unit 402 is also coupled to an optical transmitter/receiver 404 via a cable 406. Alternatively, the evaluation unit 402 may communicate with the optical transmitter/receiver 404 wirelessly. Alternatively, a separate optical transmitter and receiver are provided. The optical transmitter/receiver 404 is coupled to an upper grid plate 412 via a first optical fiber cable 414 and a lower grid plate 416 via a second optical fiber cable 418. The upper and lower grid plates 412, 416 may be disposed on the neck 102 and/or the torso 102r of the tool 102. The optical transmitter/receiver 404 is configured to transmit light onto each of the upper and lower grid plates 412, 416 via respective first and second optical fiber cables 414, 418. The light is transmitted back to the optical transmitter/receiver 404 via the same or additional respective fiber cables 412, 416. Under zero torque conditions, the light transmissions from the upper and lower grid plates 412, 416 are in phase with each other. When torque is applied to the tool 102, the reflected light from the upper and lower grid plates 412, 416 is modulated. Phase change measurements are received by the optical transmitter/receiver 404 and transmitted to the evaluation unit 402, where the magnitude of torque exerted on the tool 102 is calculated based on the phase difference.

Figure 5:
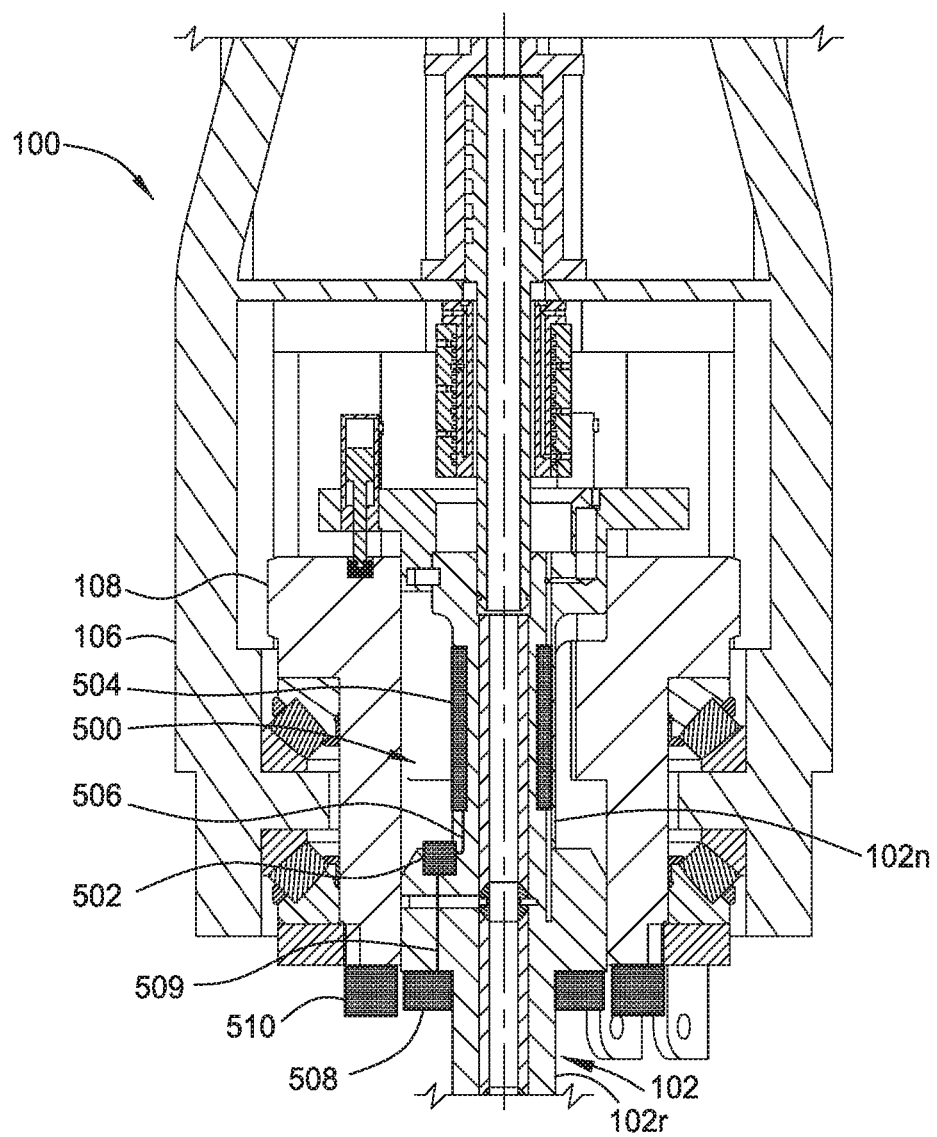
FIG. 5 is an enlarged view of the motor unit having a torque measuring device according to yet another embodiment of the present disclosure.

FIG. 5 shows an enlarged view of the motor unit 100 having a torque measurement device (TMD) 500, according to another embodiment of the disclosure. As shown, the TMD 500 is disposed on the neck 102n of the tool 102. The TMD 500 may also, or alternatively, be disposed on the torso 102r of the tool 102. The TMD 500 includes any appropriate sensor for high precision, contactless torque measurements. The TMD 500 includes an evaluation unit 502, such as a processor, connected to a coupling member 508 via cable 509. Alternatively, the evaluation unit 502 may communicate with the coupling member 508 wirelessly. The drive gear 108 includes a device 510 for transmitting energy and data with the coupling member 508. For example, the coupling member 508 is configured to wirelessly and continuously transfer measurements processed by the evaluation unit 502 to the device 510. Power transmission from the device 510 to the coupling member 508 is performed by using induction. Alternatively, power and data transmission between the device 510 and the coupling member 508 is performed via cables through the swivel. Alternatively, power may be generated directly at the tool 102 or stored for use in a battery or electrical accumulator.

The evaluation unit 502 is also coupled to a sensing member 504 via cable 506. Alternatively, the evaluation unit 502 may communicate with the sensing member 504 wirelessly. In one embodiment, the sensing member 504 includes a surface acoustic wave (SAW) sensor. In one embodiment, the SAW sensor includes a piezoelectric substrate having an input transducer separated by a distance from an output transducer. A surface wave propagates between the input and output transducers on the piezoelectric substrate. Under zero torque conditions, the surface wave has a phase associated with a zero torque applied to the tool 102. When torque is applied to the tool 102, the distance between the input and output transducers changes and the surface wave exhibits a phase different from the zero torque phase. The phase measurements are transmitted from the sensing member 504 to the evaluation unit 502, where the magnitude of the torque exerted on the tool 102 is calculated based on the phase difference. In another embodiment, the SAW sensor is used as a resonant element. For example, the SAW sensor includes the piezoelectric substrate having spaced apart interdigital electrodes. When zero torque is applied to the tool 102, a surface wave with a baseline resonant frequency propagates on the substrate between the electrodes. When torque is applied to the tool 102, the spacing between the electrodes changes, thereby changing the resonant frequency of the surface wave between the electrodes. If used as an amplifier feedback, the resonant frequency and the distance between the electrodes can be measured and evaluated.

In another embodiment, the sensing member 504 includes strain/compression load cells as described herein. The load cells may be appropriately positioned on the neck 102n and/or the torso 102r in order to accurately measure the torque and/or load exerted on the tool 102. The load cells may be connected to the evaluation unit 502 for interpreting gathered measurements. For example, when torque and/or load is exerted on the tool 102, the strain changes an electrical resistance of the load cells in proportion to the torque and/or load. The change in electrical resistance of the load cell is transmitted to the evaluation unit 502, where the torque and/or load exerted on the tool 102 is calculated based on the change in electrical resistance.

Figure 6:
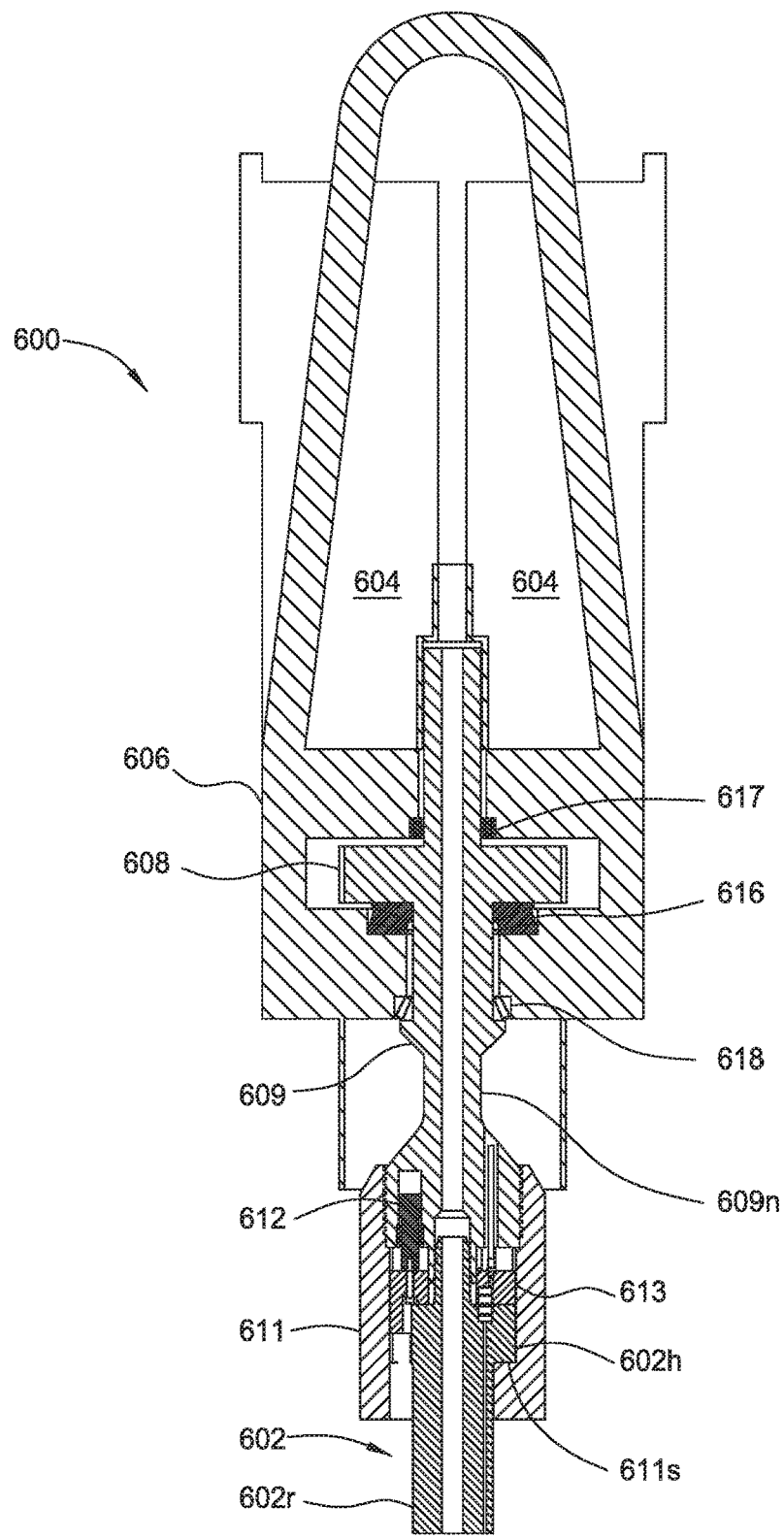
FIG. 6 illustrates an alternative motor unit of a top drive system, according to one embodiment of the present disclosure.

FIG. 6 illustrates a motor unit 600 of a top drive system. The motor unit 600 is connected to a tool 602, as shown in FIGS. 6-9. The tool 602 is configured for attachment to a casing, drilling, and/or cementing string. The motor unit 600 includes drive motors 604, a drive body 606, and a drive gear 608. The drive body 606 may include a lower tubular portion with a bore therethrough and openings at respective longitudinal ends thereof. The drive gear 608 may be disposed in an inner cavity of the drive body 606.

In one embodiment, the motor unit 600 is attached to a coupling unit. The coupling unit transfers torque and load from the motor unit 600 to the tool 602. The coupling unit may be at least partially disposed in the lower tubular portion of the drive body 606. The coupling unit may include a shaft 609, a housing 611, and a thread compensator 612. The shaft 609 may include a neck 609*n*. The shaft 609 may have couplings, such as threaded couplings, formed at a lower longitudinal end thereof on an outer surface of the shaft 609 that can connect to the housing 611 and on an inner surface of the shaft 609 that can connect one of several tools 602, such as a drilling tool exemplarily shown in FIG. 6. The housing 611 may be tubular and have a longitudinal bore therethrough. The housing 611 may have a coupling, such as a threaded coupling, formed at a longitudinal end thereof for connection to the corresponding coupling of the shaft 609. The housing 611 may have a shoulder 611*s* located at a lower longitudinal end thereof. The compensator 612 is configured to remove strain on threads during make-up and break out of connections. The drive gear 608 may be coupled to and disposed on an outside of the shaft 609. The drive gear 608 may be integrally connected to the shaft 609. The drive gear 608 and shaft 609 are rotatable relative to the drive body 606. For example, thrust bearings 616, 617, 618 allow the drive gear 608 and shaft 609 to rotate relative to the drive body 606. The drive motors 604 are operable to torsionally drive respective motor gears (not shown) via a shaft (not shown). The motor gears are meshed with the drive gear 608 for torsional driving thereof.

The tool 602 may include a head 602*h* and a torso 602*r*. In one embodiment, the compensator 612 includes a lock ring 613 having retractable lock pins, which when extended, are configured to engage respective slots formed in the head 602*h* of the tool 602, thereby connecting the lock ring 613 to the tool 602 and allowing a lift up via the compensator 612. Alternatively, a rotating latch ring may connect the lock ring 613 to the tool 602. The head 602*h* rests on the shoulder 611*s* of the housing, transferring the load of the tool 602 to the drive gear 608 through the shaft 609 via the compensator 612 and housing 611. The housing 611 may include a locking profile on an inner surface thereof for engagement with a respective profile on the tool head 602*h*. As a result, torque may be transferred from the drive gear 608 to the tool 602 via the couplings between the shaft 609 and the housing 611 and via the profiles in the housing 611 and the head 602*h*. As a result, the tool 602 is longitudinally and torsionally connected to the drive gear 608, thereby forming a top drive.

The motor unit 600 includes at least one torque measurement device for measuring a torque exerted on the motor unit 600. The torque measurement device may be disposed at any appropriate location on the motor unit 600 to increase accuracy and response time and decrease the influence of a weight load on the tool 602.

In one embodiment, the motor unit 600 includes the torque measurement device (TMD) 200, as shown in FIGS. 2A and 2B. Motor unit 600 may replace the motor unit 100. Motor unit 600 may include the rail bracket 110 and bridges 122*a,b*, 124*a,b*, as shown in FIGS. 2A and 2B. For example, a respective TMD 200 is disposed on at least one of the bridges 122*a,b* and 124*a,b*. In one embodiment, two TMDs 200 are used on lower respective bridges 124*a,b*. In another embodiment, four TMDs 200 are disposed on respective upper and lower bridges 122*a,b* and 124*a,b*. In this embodiment, the TMDs are mounted on the upper and lower bridges to enhance measurement accuracy and compensation. Each TMD 200 may be disposed on an outer-facing surface (as shown in FIGS. 2A and 2B) or an inner-facing surface of each respective bridge. The TMD 200 includes any appropriate sensor for measuring torque. For example, the TMD 200 includes sensing members, such as any appropriate load cell for measuring strain and compression. The load cells may be appropriately positioned on the bridges 122*a,b* and 124*a,b* to measure the torque exerted on the motor unit 600. The TMD 200 may be connected to an evaluation unit, such as a processor, for interpreting torque measurements. For example, when torque is exerted on the motor unit 600, the torque changes an electrical resistance of the load cells in proportion to the torque. The change in electrical resistance of the load cell is transmitted to the evaluation unit, where the change is calibrated to correspond to a torque exerted on the tool 602. The upper and lower bridges 122*a,b* and 124*a,b* may tilt due to vertical or horizontal movement of the motor unit 600 relative to the bracket 110. The tilting of the bridges 122*a,b* and 124*a,b* causes additional loading of the bridges that increase the measured tensional strain and therefore changes the electrical resistance of the load cells in proportion to a tilting angle of the bridges 122*a,b* and 124*a,b* causing an incorrect torque measurement by the evaluation unit. The tilting angle of the bridges 122*a,b*, and 124*a,b* may be measured relative to the motor unit 600 and/or the bracket 110. The measured tilting angle and change in electrical resistance of the load cell is transmitted to the evaluation unit, where the change in electrical resistance and measured tilting angle are calibrated to correspond to a torque exerted on the tool 602. Alternatively, load measuring bolts may be used to connect the bridges 122*a,b* and 124*a,b* to the bracket 110 and/or motor unit 600. The load measuring bolts may measure the load exerted on the bridges 122*a,b*, and 124*a,b* due to vertical or horizontal movement of the motor unit 600 relative to the bracket 110. The measured load is transmitted to the evaluation unit with the change in electrical resistance of the load cell, where the change in electrical resistance and measured load are calibrated to correspond to a torque exerted on the tool 602.

Figure 7:
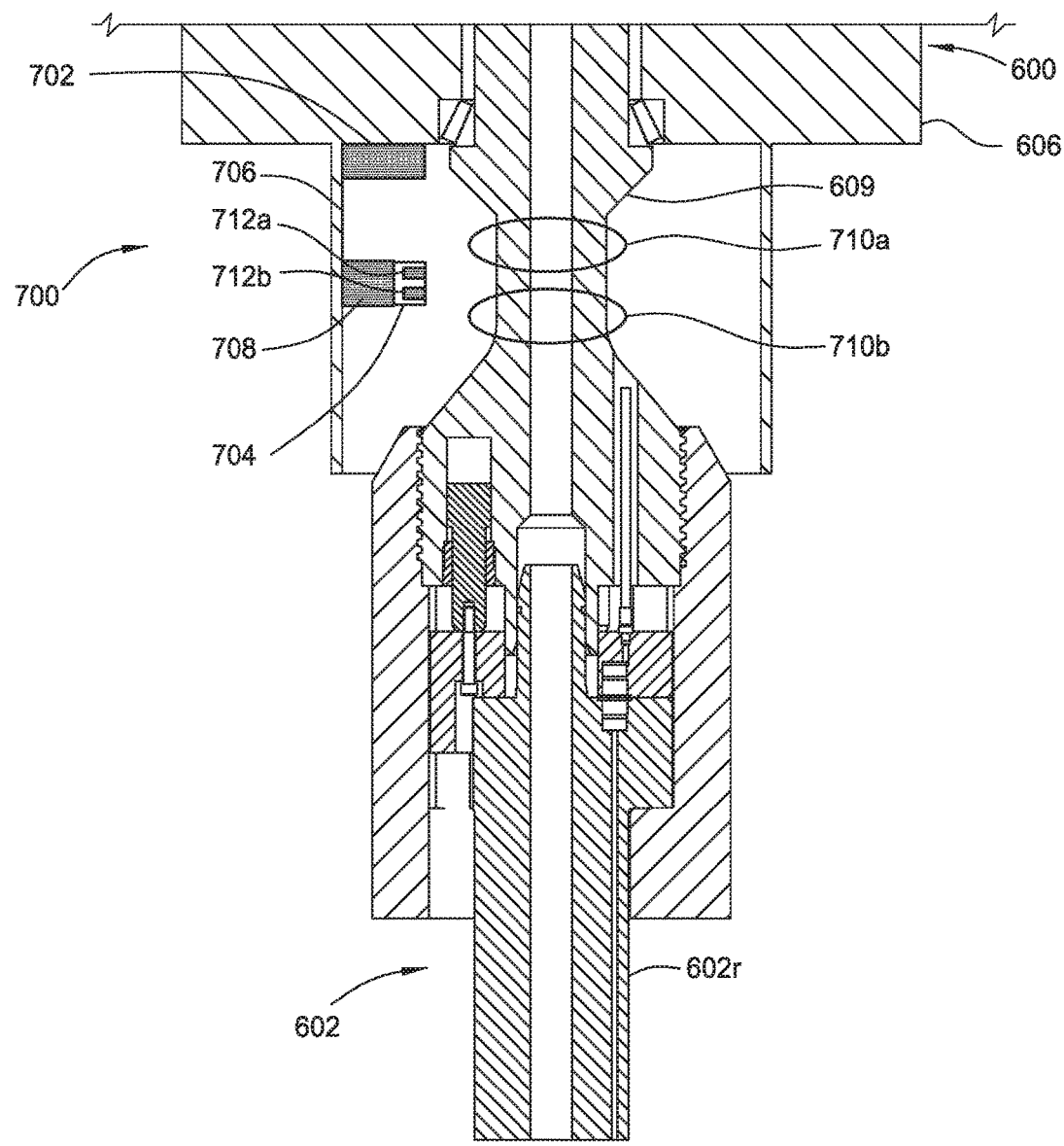
FIG. 7 is an enlarged view of the alternative motor unit having a torque measuring device according to another embodiment of the present disclosure.

In one embodiment, the motor unit 600 includes a torque measurement device (TMD) 700, as shown in FIG. 7. FIG. 7 shows an enlarged view of the motor unit 600. The TMD 700 is disposed on the lower tubular portion of the drive body 606. The TMD 700 may be similar to the TMD 300. The TMD 700 includes an evaluation unit 702, such as a processor, connected to a sensing member 704 via cable 706. Alternatively, the evaluation unit 702 may communicate with the sensing member 704 wirelessly. The TMD 700 may also include a positioning device 708 having a positioning shaft configured to move the sensing member 704 between a retracted position and an extended position. For example, the sensing member 704 is in the extended position during the operation of the motor unit 600 and/or the tool 602. The positioning shaft moves the sensing member 704 towards the retracted position during non-operational times of the motor unit 600 and/or the tool 602. The TMD 700 includes any appropriate sensing member 704 for high precision, contactless torque measurements. For example, the sensing member 704 is configured to measure a magnetostrictive effect on the shaft 609.

In one embodiment, the sensing member 704 includes at least one inverse magnetostrictive sensor. At least a portion of the tool 602 includes ferromagnetic material. For example, the tool includes magnetized areas 710*a* and 710*b*. As shown, the magnetized areas 710*a,b* are disposed on the neck 609n of the shaft 609. The magnetized areas 710a,b are axially aligned with a corresponding number of sensors in the sensing member 704, such as inverse magnetostrictive sensors 712a and 712b. As shown, the magnetized areas 710a,b and the sensors 712a,b are laterally spaced apart. When the shaft 609 is subject to torque, a strain on an outer surface of the shaft 609 changes the dimensions of the magnetized areas 710a,b thereby changing a magnetic field between the magnetized areas 710a,b and the sensors 712a,b. The inverse magnetostrictive sensors 712a,b are configured to measure the magnetic field changes in real time. Thereafter, the sensing member 704 transmits the magnetic field measurements to the evaluation unit 702 via the cable 706. The evaluation unit 702 calculates the magnitude of the torque exerted on the magnetized areas 710a,b of the shaft 609 based on the change in the magnetic field measured by the sensors 712a,b.

In another embodiment, the sensing member 704 includes an anisotropic magnetostrictive sensor. In this embodiment, the sensing member 704 is axially aligned with a magnetized area, such as area 710a or 710b. In operation, torque exerted on the shaft 609 may cause a compressive stress and/or tensile stress on the magnetized area. The permeability for magnetization in a direction of compressive stress is different in comparison to magnetization in a direction of tensile stress. The anisotropic magnetostrictive sensor in the sensing member 704 is configured to measure the difference in permeability and transmit the measurements to the evaluation unit 702 via the cable 706. Thereafter, the evaluation unit 702 calculates the magnitude of torque exerted on the magnetized area of the shaft 609 based on the difference in permeability.

Figure 8:
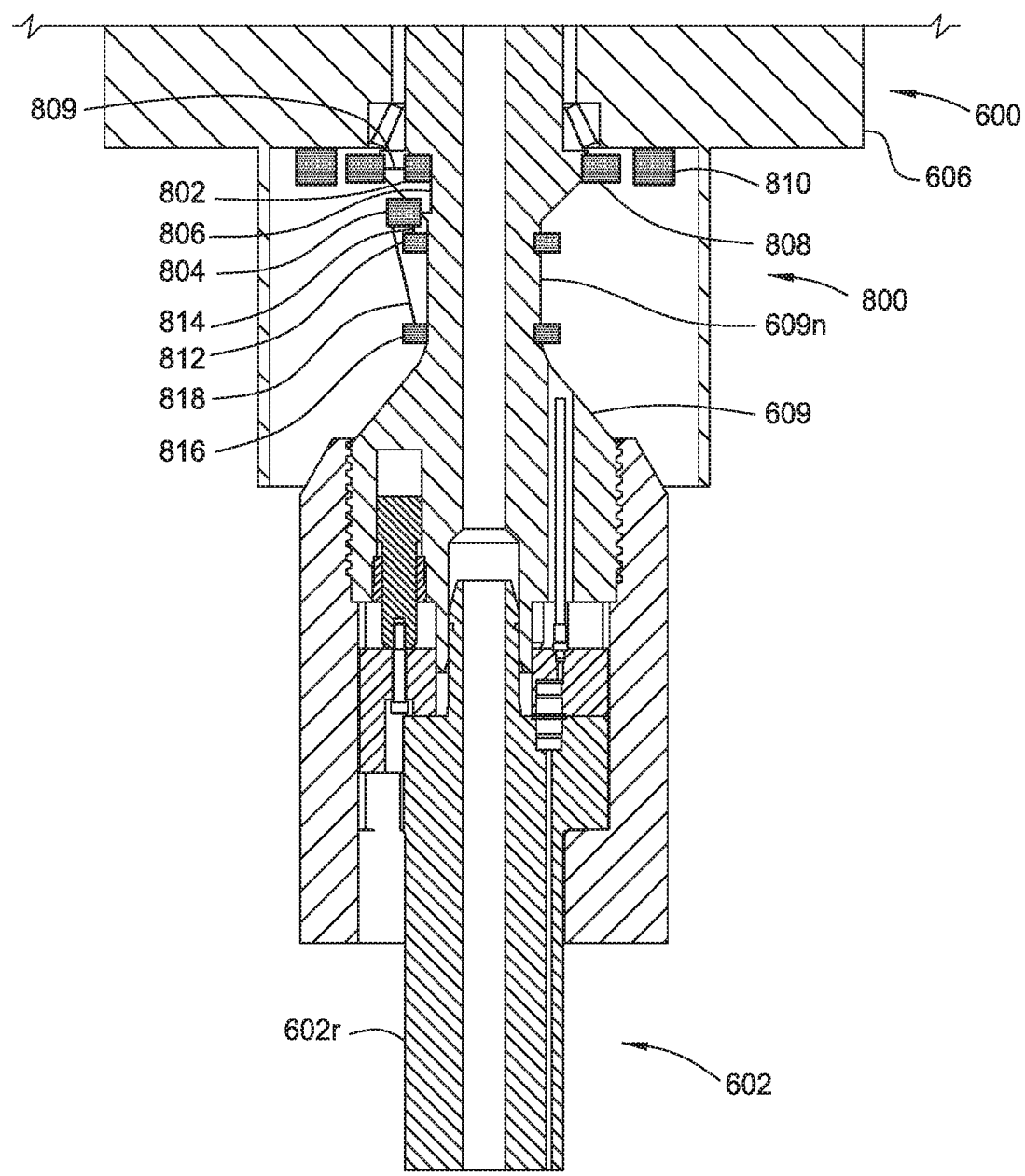
FIG. 8 is an enlarged view of the alternative motor unit having a torque measuring device according to yet another embodiment of the present disclosure.

FIG. 8 shows an enlarged view of the motor unit 600 having a torque measurement device (TMD) 800, according to another embodiment of the disclosure. The TMD 800 may be similar to the TMD 400. As shown, the TMD 800 is disposed on the neck 609n of the shaft 609. The TMD 800 may also, or alternatively, be disposed on the torso 602r of the tool 602. The TMD 800 includes any appropriate sensor for high precision, contactless torque measurements, such as an optical sensor. The TMD 800 includes an evaluation unit 802, such as a processor, connected to a coupling member 808 via a cable 809. Alternatively, the evaluation unit 802 may communicate with the coupling member 808 wirelessly. The drive body 606 includes a device 810 for transmitting energy and data with the coupling member 808. The coupling member 808 is configured to wirelessly and continuously transfer measurements processed by the evaluation unit 802 to the device 810. Power transmission from the device 810 to the coupling member 808 is performed by using induction. Alternatively, power and data transmission between the device 810 and the coupling member 808 is performed via cables through a swivel of the motor unit 600. Alternatively, power may be generated directly at the tool 602 or stored for use in a battery or electrical accumulator.

The evaluation unit 802 is also coupled to an optical transmitter/receiver 804 via a cable 806. Alternatively, the evaluation unit 802 may communicate with the optical transmitter/receiver 804 wirelessly. Alternatively, a separate optical transmitter and receiver are provided. The optical transmitter/receiver 804 is coupled to an upper grid plate 812 via a first optical fiber cable 814 and a lower grid plate 816 via a second optical fiber cable 818. The upper and lower grid plates 812, 816 may be disposed on the neck 609n of the shaft 609 and/or the torso 602r of the tool 602. The optical transmitter/receiver 804 is configured to transmit light onto each of the upper and lower grid plates 812, 816 via respective first and second optical fiber cables 814, 818. The light is transmitted back to the optical transmitter/receiver 804 via the same or additional respective fiber cables 812, 816. Under zero torque conditions, the light transmissions from the upper and lower grid plates 812, 816 are in phase with each other. When torque is applied to the shaft 609 and tool 602, the reflected light from the upper and lower grid plates 812, 816 is modulated. Phase change measurements are received by the optical transmitter/receiver 804 and transmitted to the evaluation unit 802, where the magnitude of torque exerted on the shaft 609 and/or tool 602 is calculated based on the phase difference.

Figure 9:
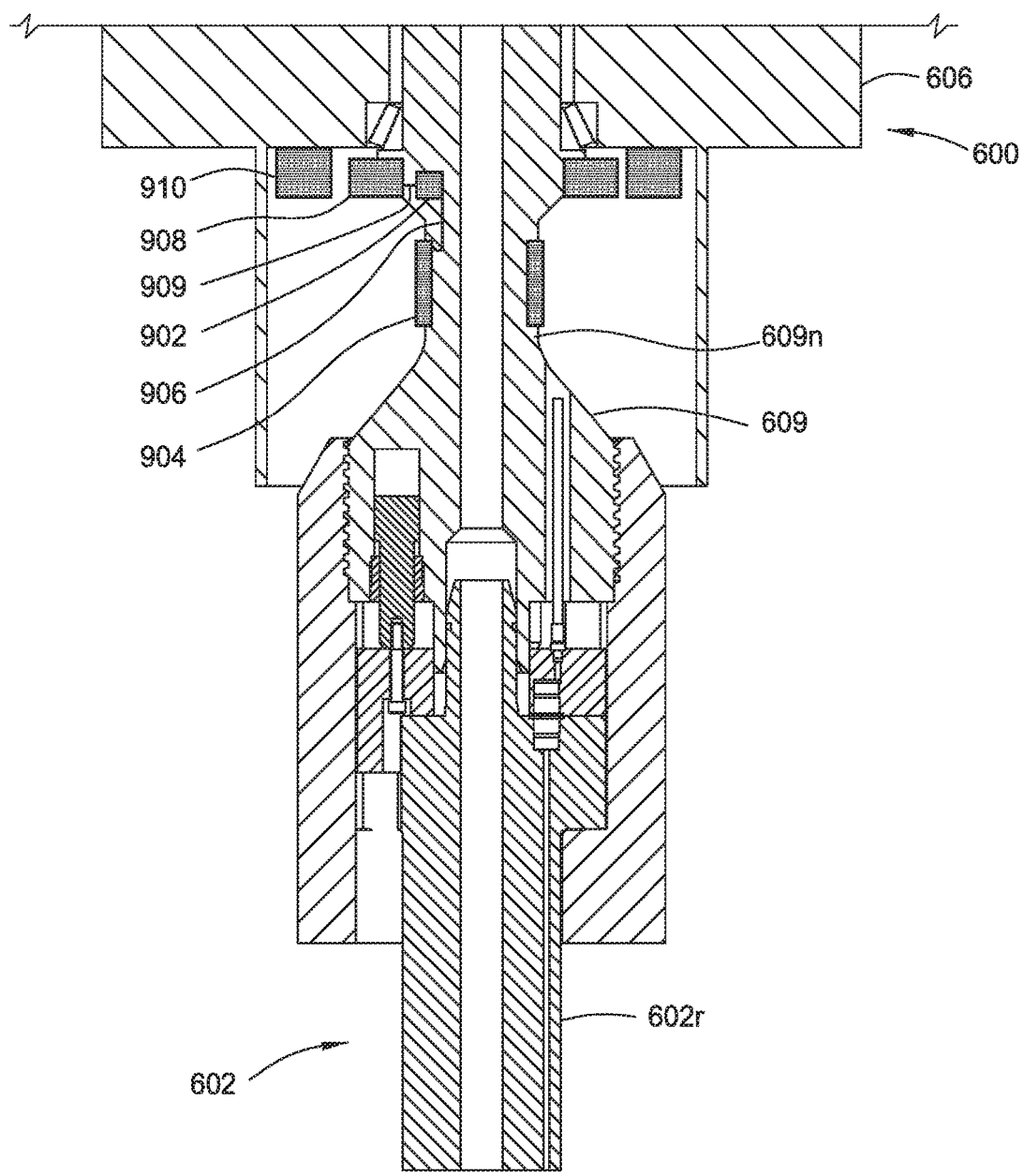
FIG. 9 is an enlarged view of the alternative motor unit having a torque measuring device according to yet another embodiment of the present disclosure.

FIG. 9 shows an enlarged view of the motor unit 600 having a torque measurement device (TMD) 900, according to another embodiment of the disclosure. The TMD 900 may be similar to the TMD 500. As shown, the TMD 900 is disposed on the neck 609n of the shaft 609. The TMD 900 may also, or alternatively, be disposed on the torso 602r of the tool 602. The TMD 900 includes any appropriate sensor for high precision, contactless torque measurements. The TMD 900 includes an evaluation unit 902, such as a processor, connected to a coupling member 908 via cable 909. Alternatively, the evaluation unit 902 may communicate with the coupling member 908 wirelessly. The drive body 606 includes a device 910 for transmitting energy and data with the coupling member 908. For example, the coupling member 908 is configured to wirelessly and continuously transfer measurements processed by the evaluation unit 902 to the device 910. Power transmission from the device 910 to the coupling member 908 is performed by using induction. Alternatively, power and data transmission between the device 910 and the coupling member 908 is performed via cables through the swivel. Alternatively, power may be generated directly at the tool 602 or stored for use in a battery or electrical accumulator.

The evaluation unit 902 is also coupled to a sensing member 904 via cable 906. Alternatively, the evaluation unit 902 may communicate with the sensing member 904 wirelessly. In one embodiment, the sensing member 904 includes a surface acoustic wave (SAW) sensor. In one embodiment, the SAW sensor includes a piezoelectric substrate having an input transducer separated by a distance from an output transducer. A surface wave propagates between the input and output transducers on the piezoelectric substrate. Under zero torque conditions, the surface wave has a phase associated with a zero torque applied to the shaft 609 and tool 602. When torque is applied to the shaft 609 and tool 602, the distance between the input and output transducers changes and the surface wave exhibits a phase different from the zero torque phase. The phase measurements are transmitted from the sensing member 904 to the evaluation unit 902, where the magnitude of the torque exerted on the shaft 609 and/or the tool 602 is calculated based on the phase difference. In another embodiment, the SAW sensor is used as a resonant element. For example, the SAW sensor includes the piezoelectric substrate having spaced apart interdigital electrodes. When zero torque is applied to the shaft 609 and the tool 602, a surface wave with a baseline resonant frequency propagates on the substrate between the electrodes. When torque is applied to the shaft 609 and the tool 602, the spacing between the electrodes changes, thereby changing the resonant frequency of the surface wave between the electrodes. If used as an amplifier feedback, the resonant frequency and the distance between the electrodes can be measured and evaluated.

In another embodiment, the sensing member 904 includes strain/compression load cells as described herein. The load cells may be appropriately positioned on the shaft 609 and/or the torso 602r in order to accurately measure the torque exerted on the shaft 609 and/or the tool 602. The load cells may be connected to the evaluation unit 902 for interpreting gathered measurements. For example, when torque is exerted on the shaft 609 and the tool 602, the strain changes an electrical resistance of the load cells in proportion to the torque. The change in electrical resistance of the load cell is transmitted to the evaluation unit 902, where the torque exerted on the shaft 609 and/or the tool 602 is calculated based on the change in electrical resistance.

Figure 10:
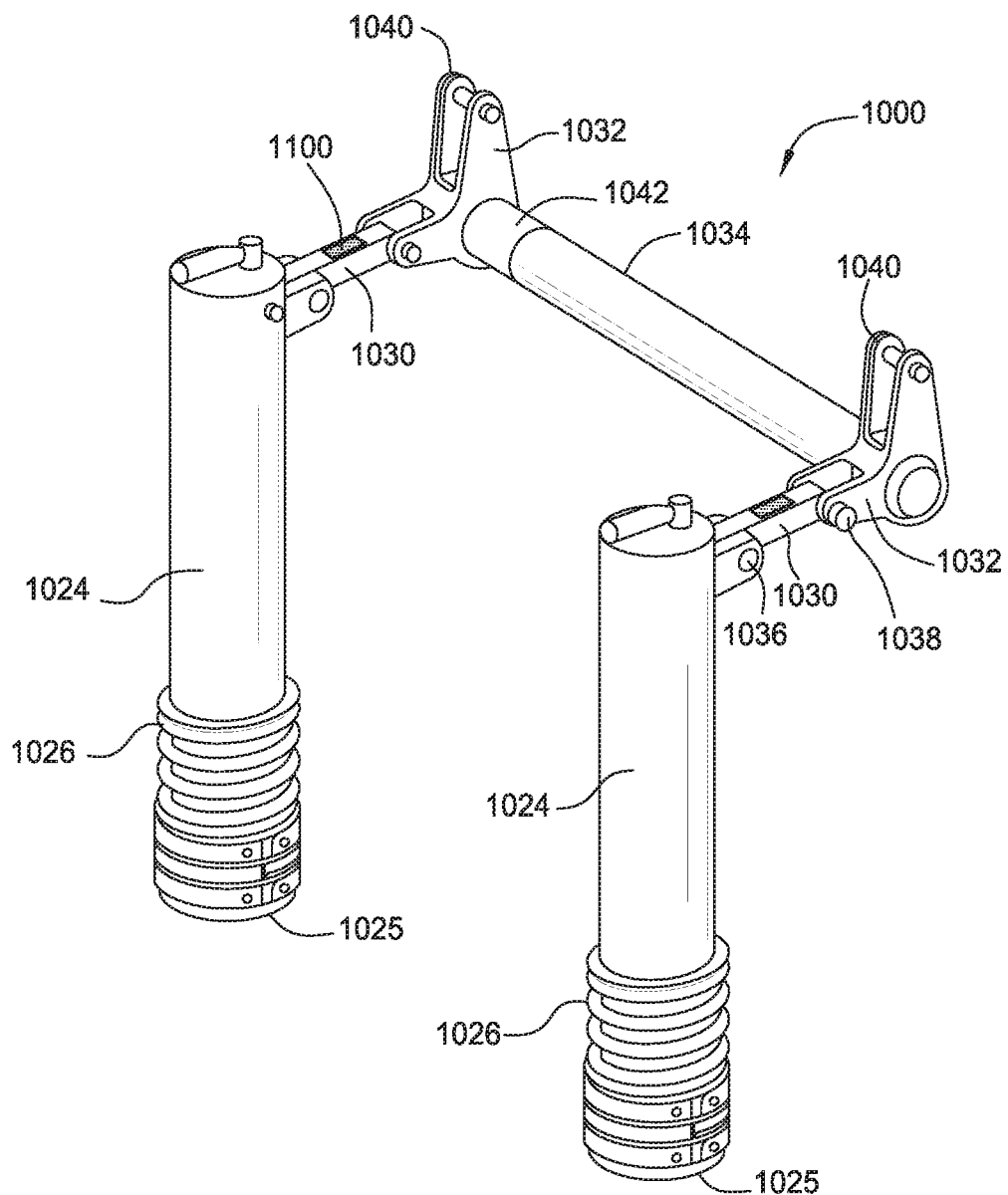
FIG. 10 illustrates a load transfer assembly of a tong assembly having a torque measuring device according to one embodiment of the present disclosure.

FIG. 10 illustrates a load transfer assembly 1000 of a tong assembly. An exemplary tong assembly is disclosed in P.C.T. Patent Application Number US2016/030992, which is hereby fully incorporated by reference, in particular, paragraphs [0027]-[0036] and FIGS. 1D and 1E.

The load transfer assembly 1000 may include two links 1030, two bell cranks 1032, and a torque bar 1034. The links 1030a,b are coupled between the support legs 1024 and the bell cranks 1032. Each link 1030a,b is coupled to the corresponding support leg 1024 by a pivot connection 1038. The two bell cranks 1032 are joined together through the torque bar 1034. In one embodiment, the bell cranks 1032 may be fixedly coupled to the torque bar 1034 at opposite ends of the torque bar 1034. The bell cranks 1032 are further coupled to the frame 1008 of the power tong 1002 by pivot connections 1040.

In one embodiment, the tong assembly includes a torque measurement device (TMD) 1100 on the load transfer assembly 1000. For example, a respective TMD 1100 is disposed on at least one of the links 1030a,b. In one embodiment, at least one TMD 1100 is disposed on each link 1030a,b. In this embodiment, the TMDs are mounted on the links 1030a,b to enhance measurement accuracy and compensation. Each TMD 1100 may be disposed on an outer-facing surface or an inner-facing surface of each respective link 1030a,b. The TMD 1100 includes any appropriate sensor for measuring torque. For example, the TMD 1100 includes sensing members, such as any appropriate load cell for measuring strain and compression. The load cells may be appropriately positioned on the links 1030a,b to measure the torque exerted on the tong assembly. The TMD 1100 may be connected to an evaluation unit, such as a processor, for interpreting torque measurements. For example, when torque is exerted on the tong assembly, the torque changes an electrical resistance of the load cells in proportion to the torque. The change in electrical resistance of the load cell is transmitted to the evaluation unit, where the change is calibrated to correspond to a torque exerted on the tubular.

Each of the evaluation units described herein may be linked to a data network, monitoring, or control system for receiving the processed torque magnitude. The embodiments described herein may be included in the motor units 100, 600 in any combination to provide multiple torque measurements. For example, the TMD may be appropriately disposed on the drive body 106, 606, drive gear 108, 608, and/or the tool 102, 602 to measure the torque exerted on the tool 102, 602. Furthermore, multiple embodiments of the TMD may be combined to provide multiple measurements of torque for increased accuracy.

While the foregoing is directed to embodiments of the present invention, other and further embodiments of the invention may be devised without departing from the basic scope thereof, and the scope thereof is determined by the claims that follow.

In one embodiment, a top drive system for use with a tool for handling tubulars on a drilling rig includes a motor unit; a coupling unit that transfers torque to the tool; a torque measurement device (TMD) coupled to at least one of the motor unit, the tool, or the coupling unit, wherein the TMD includes a sensing member coupled to an evaluation unit, wherein the sensing member is configured to measure a magnetostrictive effect and the evaluation unit is configured to calculate a magnitude of the torque reaction force based on the magnetostrictive effect.

In one or more of the embodiments described herein, the motor unit includes a drive body, a drive motor, and a drive ring torsionally connected to a rotor of the drive motor and the motor unit selectively connects to the tool via at least one of a latch profile, a load shoulder, a threaded connection, and friction.

In one or more of the embodiments described herein, the coupling unit is configured to support a tubular and the tool is configured to generate the torque reaction force when the tubular is rotated.

In one or more of the embodiments described herein, the sensing member includes an anisotropic magnetostrictive sensor.

In one or more of the embodiments described herein, the sensing member includes an inverse magnetostrictive sensor.

In one or more of the embodiments described herein, the sensing member is axially aligned with a magnetized area on the tool.

In one or more of the embodiments described herein, the TMD is coupled to a drive gear in the motor unit.

In one or more of the embodiments described herein, the TMD is coupled to a drive body in the motor unit.

In one or more of the embodiments described herein, the TMD is coupled to the motor unit.

In one or more of the embodiments described herein, the TMD is coupled to the coupling unit.

In another embodiment, a top drive system for use with a tool for handling tubulars on a drilling rig includes a motor unit; a coupling unit that transfers torque to the tool and a torque measurement device (TMD) coupled to at least one of the motor unit or the tool, wherein the TMD includes: an optical transmitter, an optical receiver configured to receive an optical signal from the transmitter, an evaluation unit coupled to the receiver, wherein the evaluation unit is configured to calculate a magnitude of the torque reaction force based on the optical signal.

In one or more of the embodiments described herein, the motor unit includes a drive body, a drive motor, and a drive ring torsionally connected to a rotor of the drive motor and the motor unit selectively connects to the tool via at least one of a latch profile, a load shoulder, a threaded connection, and friction.

In one or more of the embodiments described herein, the coupling unit is configured to support a tubular and the tool is configured to generate the torque reaction force when the tubular is rotated.

In one or more of the embodiments described herein, the tool includes a grid plate configured to reflect the optical signal from the transmitter.

In one or more of the embodiments described herein, wherein the tool includes the TMD.

In another embodiment, a top drive system for use with a tool for handling tubulars on a drilling rig includes a motor unit; a coupling unit that transfers torque to the tool and a torque measurement device (TMD) coupled to at least one of the motor unit or the tool, wherein the TMD includes: a sensing member coupled to an evaluation unit, wherein the sensing member is configured to measure a phasing of an RF signal and the evaluation unit is configured to calculate a magnitude of the torque reaction force based on the shift of the phasing of the RF signal.

In one or more of the embodiments described herein, the motor unit includes a drive body, a drive motor, and a drive ring torsionally connected to a rotor of the drive motor and the motor unit selectively connects to the tool via at least one of a latch profile, a load shoulder, a threaded connection, and friction.

In one or more of the embodiments described herein, the motor unit includes a device configured to provide power to the evaluation unit by induction.

In one or more of the embodiments described herein, power and data transmission between a device configured to provide power to the evaluation unit is performed via cables through a swivel.

In one or more of the embodiments described herein, power and data transmission between a device configured to provide power to the evaluation unit is generated at the tool or stored for use in a battery or an electrical accumulator.

In one or more of the embodiments described herein, wherein the tool includes the TMD.

In another embodiment, a method of calculating torque for a top drive system includes applying a torque to a tool using a coupling unit, measuring a magnetostrictive effect using a sensing member, transmitting the measured magnetostrictive effect to an evaluation unit, and calculating the torque based on the measured magnetostrictive effect.

In another embodiment, a method of calculating torque for a top drive system includes applying a torque to a tool using a coupling unit, measuring an optical signal using a sensing member, transmitting the measured optical signal to an evaluation unit, and calculating the torque based on the measured optical signal.

In another embodiment, method of calculating torque for a top drive system includes, applying a torque to a tool using a coupling unit, measuring a phasing of an RF signal using a sensing member, transmitting the measured phasing of the RF signal to an evaluation unit, and calculating the torque based on the measured phasing of the RF signal.

In another embodiment, a method of calculating torque for a top drive system including applying a torque to a tool using a coupling unit, measuring a change in electrical resistance using a sensing member, transmitting the measured change in electrical resistance to an evaluation unit, and calculating the torque based on the measured change in electrical resistance.

In another embodiment, a top drive system for use with a tool for handling tubulars on a drilling rig includes a motor unit, wherein the motor unit includes a drive body, a drive motor, and a drive ring torsionally connected to a rotor of the drive motor and the motor unit selectively connects to the tool via at least one of a latch profile, a load shoulder, a threaded connection, and friction, wherein the tool is configured to generate a torque reaction force; and a bracket coupled to the motor unit, wherein the bracket includes at least one sensing member configured to measure a change in electrical resistance and the evaluation unit is configured to calculate a magnitude of the torque reaction force based on the change in electrical resistance.

The invention claimed is:

1. A top drive system for use with a tool for handling tubulars on a drilling rig, comprising:
a motor unit;
a coupling unit that transfers torque to the tool;
a torque measurement device (TMD) coupled to at least one of the motor unit, the tool, or the coupling unit, the TMD having:
a sensing member configured to measure a magnetostrictive effect;
a positioning device coupled to the sensing member to move the sensing member between a retracted position and an extended position; and
an evaluation unit coupled to the sensing member and configured to calculate a magnitude of the torque reaction force based on the magnetostrictive effect.

2. The top drive system of claim 1, wherein the motor unit includes a drive body, a drive motor, and a drive ring torsionally connected to a shaft of the drive motor and the motor unit selectively connects to the tool via at least one of a latch profile, a load shoulder, a threaded connection, and friction.

3. The system of claim 1, wherein the coupling unit is configured to support a tubular and the tool is configured to generate the torque reaction force when the tubular is rotated.

4. The system of claim 1, wherein the sensing member includes an anisotropic magnetostrictive sensor.

5. The system of claim 1, wherein the sensing member includes an inverse magnetostrictive sensor.

6. The system of claim 1, wherein the sensing member is axially aligned with a magnetized area on the tool.

7. The system of claim 1, wherein the TMD is coupled to a drive gear in the coupling unit.

8. The system of claim 7, wherein the positioning device is disposed on the drive gear, and motor gears of the motor unit are meshed with the drive gear for torsional driving.

9. The system of claim 1, wherein the TMD is coupled to a drive body in the motor unit.

10. The system of claim 9, wherein the positioning device is disposed on the drive body of the motor unit.

11. The system of claim 1, wherein the TMD is coupled to the motor unit.

12. The system of claim 1, wherein the coupling unit transfers a load to the tool.

13. The system of claim 1, wherein the positioning device comprises a positioning shaft, and the sensing member is coupled to the positioning shaft.

14. A top drive system for use with a tool for handling tubulars on a drilling rig, comprising:
a motor unit;
a drive gear rotatably coupled to the motor unit, wherein the drive gear includes a bore for receiving the tool, and the drive gear is configured to transfer a torque load from the motor unit to the tool;
a sensing member disposed on the drive gear and configured to measure a magnetostrictive effect on the tool;
an evaluation unit connected to the sensing member and configured to calculate a magnitude of transferred torque based on the magnetostrictive effect; and
a positioning device coupled to the sensing member to move the sensing member between a retracted position and an extended position.

15. The system of claim 14, wherein the motor unit includes a drive body and a drive motor, the drive body torsionally restrains the drive motor, the drive gear is coupled between the drive motor and the tool, and the drive gear is rotatable relative to the drive body.

16. The system of claim 14, wherein the sensing member includes an anisotropic magnetostrictive sensor.

17. The system of claim 14, wherein the sensing member includes an inverse magnetostrictive sensor.

18. The system of claim 14, wherein the sensing member is axially aligned with a magnetized area on the tool when the tool is received in the drive gear.

19. The system of claim 14, wherein the positioning device comprises a positioning shaft, and the sensing member is coupled to the positioning shaft.

* * * * *